(12) United States Patent
Bansevicius et al.

(10) Patent No.: US 6,262,514 B1
(45) Date of Patent: Jul. 17, 2001

(54) BEARINGS AND SUPPORTS

(75) Inventors: Ramutis Bansevicius, Kaunas (LT); Sami Ahmed, Birmingham (GB)

(73) Assignee: Intelligent Manufacturing Systems Limited, Birmingham (GB)

( * ) Notice: Subject to any disclaimer, the term of this patent is extended or adjusted under 35 U.S.C. 154(b) by 0 days.

(21) Appl. No.: 09/248,928

(22) Filed: Feb. 12, 1999

Related U.S. Application Data (63) Continuation-in-part of application No. PCT/GB97/02206, filed on Aug. 13, 1997, and a continuation-in-part of application No. PCT/GB97/02190, filed on Aug. 13, 1997.

(30) Foreign Application Priority Data

Aug. 14, 1996 (GB) .................................................. 9617076

(51) Int. Cl.$^7$ ...................................................... H02N 2/00
(52) U.S. Cl. ............................. 310/323.01; 310/323.05; 310/323.09; 310/323.14; 310/323.17
(58) Field of Search ................... 310/323.01, 323.02, 310/323.03, 323.04, 323.05, 323.06, 323.09, 323.14, 323.16, 323.17

(56) References Cited

U.S. PATENT DOCUMENTS

| | | | |
|---|---|---|---|
| 4,019,073 | * | 4/1977 | Vishnevsky et al. ................. 310/328 |
| 4,400,641 | * | 8/1983 | Vishnevsky et al. ................. 310/328 |
| 5,039,899 | | 8/1991 | Yamaguchi ..................... 310/323.01 |
| 5,237,238 | | 8/1993 | Berghaus et al. ..................... 310/328 |
| 5,453,653 | * | 9/1995 | Zumeris ................................. 310/366 |
| 5,852,336 | * | 12/1998 | Takagi ............................. 310/323.01 |

FOREIGN PATENT DOCUMENTS 9-9656 * 1/1997 (JP) ....................................... 310/328

OTHER PUBLICATIONS

Yoshiro Tomikawa et al., Thin Rotary and Linear Ultrasonic Motors Using A Double–Mode Piezoelectric Vibrator Of The First Longitudinal and Second Bending Modes, 1 Sep. 1992. Japanese Journal of Applied Physics, vol. 31, no. 9B, pp. 3073–3076.

* cited by examiner

*Primary Examiner*—Thomas M. Dougherty
(74) *Attorney, Agent, or Firm*—Kinney & Lange, P.A.

(57) ABSTRACT

The application seeks to eliminate errors introduced by bearings and supports. It does so by integrating the drive means, in the form of a piezoelectric actuator, into the bearing or support. Thus the bearing no longer acts against the drive means, eliminating errors. It also describes a drive mechanism for elongate prismatic objects (140). The mechanism uses piezoelectric drives (148) and achieves very high accuracy of positioning with minimal backlash etc, whilst occupying only a small volume. This makes it suitable for use in electro-discharge machining and electro-discharge texturing operations where one or more wire electrodes (140) need to be positioned accurately with respect to a workpiece and maintained in that relative position as the workpiece erodes and the electrode (140) is consumed.

22 Claims, 9 Drawing Sheets

BEARINGS AND SUPPORTS

CROSS REFERENCE TO RELATED APPLICATIONS

This application is a C-I-P of PCT/GB97/02206 and a C-I-P of PCT/GB97/02190, both filed Aug. 13, 1997 and both designating the United States.

TECHNICAL FIELD OF THE INVENTION

This invention relates to machine components incorporating bearings, supports, guides and the like. It also describes the use of such components in a drive mechanism particularly applied to the control of elongate prismatic objects, such as wire electrodes for electro-discharge machining and rod electrodes for electro-discharge texturing.

BACKGROUND ART AND SUMMARY OF INVENTION

All drive mechanisms traditionally involve some form of bearing or support which serves to maintain the object in question in place by supporting its weight and/or constraining its movement along an appropriate path. Traditional bearings, supports and guides are characterized by static or dynamic errors such as backlash, hysteresis, dead zones, radial and axial play, vibration and stick-slip motion at low sliding velocities.

The present invention seeks to provide devices characterized by extremely high resolution and small time constant in which errors such as backlash, radial and axial play, dead zones and stick-slip motion at low sliding velocities are alleviated. The invention is also directed to the provision of a compact device that occupies little physical space and which can be manufactured at relatively low cost.

The applications of for which the invention is suited are many and varied. They include precision measuring systems for dimension and error control, multi-functional measuring devices and various types of supports for precision engineering, including devices used in superfinishing operations.

The applications which are at present most apparent to the applicant are electro-discharge machining (EDM) and electro-discharge texturing (EDT). In these operations, an electrode is placed a short distance from a workpiece and a high voltage is applied. As the distance is reduced, a spark will eventually be generated. This spark will erode the workpiece is the very localised area around the electrode tip. In EDM, a thin wire electrode is used, and the process can produce narrow holes in relatively hard electrically conductive materials to a significant depth. EDT is the term usually used to refer to texturing steel or aluminium rolls as a finishing operation to produce surface roughness on steel or aluminium sheet that is produced. Somewhat larger electrodes are used, in an array that is scanned over the surface of the roll in a spiral pattern, texturing the roll as it passes.

In both processes, the electrode is consumed and the position of what remains must therefore be continuously adjusted, as well as to accommodate the gradually receding workpiece. This is usually achieved by monitoring the electrical potential of the electrode relative to the workpiece. For example, if the nominal discharge voltage is $V_0$, an electrode voltage of about 30% of $V_0$ indicates satisfactory machining. A drop to below 10% indicates a short circuit, meaning that the electrode must be raised relative to the workpiece. A rise to near 100% indicates an open circuit with no discharge taking place.

Existing EDM and EDT machines support the electrode by using bearings positioned near the workpiece so as to guide and support the tip. The electrode is held and moved by a servo means, which is large and of a significant mass in order to limit vibration. This inevitably introduces static and dynamic errors (backlash, hysteresis, dead zones, radial and axial play, vibration, etc.) and the classical approach to eliminating these is to increase the accuracy and stiffness of system elements. This sharply increases the cost of the devices. Further gains in accuracy of positioning is gradually reaching its economically acceptable limits.

Where multiple electrodes are required, such as in EDT and EDM as applied to the repeatable preparation of arrays of holes, existing machines simply attach a plurality of electrodes to a single servo. It has not hitherto been practical to move each electrode independently, since the massive servo is simply too large to duplicate in the space available. This means that the electrodes must be positioned according to the progress of the slowest electrode, with the majority of electrodes at any one time being at a non-ideal position. This is clearly undesirable.

This invention eliminates neither the servo nor the bearing, but integrates both into an active bearing by forming piezoelectric motors into the bearing structure. Thus, one or both elements are made from piezoelectric material or constitute part of a piezoelectric transducer.

This invention introduces the concept of active bearings, supports and guides, including fixed and moving elements which transmit forces from one to another, thereby to impart relative motion between the elements. This relative motion is achieved by transforming high frequency mechanical oscillations of one or both elements into continuous or step motion of the travelling element. Torque or forces are generated in the contact zone between both elements, which excludes errors, common to applications requiring external drives. In essence, the drive means is integrated into the bearing, this eliminating at a stroke the errors produced by interaction at that bearing.

Almost all machines include a driven member connected to a rotary drive member. The driven member must be supported, and hence a bearing or such is provided. The classical approach to reducing or eliminating static and dynamic errors of bearings, supports and guides (backlash, hysteresis, dead zones, radial and axial play, vibration, etc.) is to increase the accuracy and stiffness of system elements. This sharply increases the cost of the devices. Further gains in accuracy of high precision elements is gradually reaching its economically acceptable limits. The approach to this problem given here is to integrate a mechanical system with electronics and control. Further to reducing the cost and increasing the final accuracy, this alternative introduces new properties in the existing systems.

This invention eliminates neither the drive unit nor the bearing, but integrates both into an active bearing by forming piezoelectric motors into the bearing structure. Thus, one or both elements are made from piezoelectric material or constitute part of a piezoelectric transducer. To achieve rotation or translational motion, high frequency oscillations are generated in the contact zone between the two elements.

Thus, in one aspect the present invention provides a machine including a drive member and a driven member in mutual contact, the drive member including a transducer element comprising a piezoelectric element and a control means adapted to supply a signal to the piezoelectric element thereby to cause vibration thereof, wherein vibration of the piezoelectric element causes motion of the driven member relative to the drive member, and the driven member is at least predominantly supported by the transducer.

It is normally preferred if the driven member is wholly supported by the transducer. However, significant improvements can still be obtained even if only part of the weight thereof is supported.

The present invention also provides a machine including a drive member and a driven member in mutual contact, the drive member including a transducer element comprising a piezoelectric element and a control means adapted to supply a signal to the piezoelectric element thereby to cause vibration thereof, wherein vibration of the piezoelectric element causes motion of the driven member relative to the drive member, and movement of the driven member takes place along a route constrained by the transducer element.

The development of active bearings was made possible through the application of piezoactive materials and of various methods of transforming high frequency multi-component mechanical oscillations into continuous or step motion. An object of this invention is to integrate unique properties of piezoactive transducers and actuators (high resolution, low time constant, easy control of forms, types and parameters of oscillation, possibility to generate multi-component static, quasi-static and resonant displacements) with control system thereby making it possible sharply to reduce or even eliminate most errors of bearings, supports and guides, used in high precision measuring devices.

It will usually be advisable to insert a wear pad between the piezoelectric element and the driven member.

In another aspect, the present invention provides a drive mechanism for an elongate prismatic object, comprising a transducer including a piezoelectric element, the transducer being positioned so as to contact the elongate object, and a control means adapted to supply a signal to the piezoelectric element thereby to cause vibration thereof; vibration of the piezoelectric element thereby causing motion, relative to the drive mechanism, in a first degree of freedom being longitudinal with respect to the elongate object, the transducer being adapted to constrain motion of the elongate object in a degree of freedom other than rotation about its longitudinal axis.

It is preferred if contact between the transducer and the elongate object exists at at least two points spaced along the longitudinal extent of the elongate object.

The invention is best applied to cylindrical objects, such as EDM or EDT electrodes. However, in this aspect it is essential only that the object has a substantially identical cross-section along its length, ie prismatic.

The control means will ideally cause vibration of the piezoelectric element in an axis parallel to the longitudinal axis of the object and also perpendicular to the axis, since this gives superior control of the elongate object. The parallel vibration is preferably such that the two contact points move out of phase, and preferably so as to include a single node along the length of the piezoelectric. This single node preferably lies between the contact points.

The perpendicular vibration is also preferably such that the two contact points move out of phase, preferably also including three nodes along the length of the piezoelectric element. These nodes preferably lie between the contact points.

If the node of the parallel vibrations and a node of the perpendicular vibrations coincide then this provides a useful point at which to fix the transducer to the remaining structure. In this respect, it is preferable for the middle node of the perpendicular vibration to be used. This coincidence point is ideally at or near the centre of the piezoelectric element.

In particularly preferred embodiments, the control means is adapted to supply a DC signal superimposed upon any vibration-inducing signals thereby to adjust the position of the elongate object in at least one direction substantially perpendicular to the length of the elongate object. This allows "fine tuning" of the lateral position of the elongate object.

It was specified above that the transducer is adapted to constrain motion of the elongate object in a degree of freedom other than rotation about its longitudinal axis. It is naturally preferred if the transducer constrains motion of the elongate object in all degrees of freedom other than translation along its longitudinal axis and rotation about that axis. However, in an individual context there may be good reasons for leaving the elongate object free to roam in a particular degree of freedom and the invention is applicable notwithstanding this.

A particularly advantageous arrangement is one in which the transducer includes a motion transfer means acted upon by the piezoelectric element and which in turn acts on the elongate object. The motion transfer means can comprise, for example, a rotatable disc. In one embodiment developed by the applicant, the rotatable disc further comprises a co-axial spindle extending therefrom, a surface of the spindle contacting the elongate object. The piezoelectric element can be cylindrical and substantially co-axial with the spindle, contact between the piezoelectric element and the disc being along a circular path on a planar surface of the disc. Alternatively, contact between the piezoelectric element and the disc can be at one or more points on the circumferential face of the disc. A magnetic element acting on the motion transfer means is often useful for maintaining it in contact with the piezoelectric element.

The compactness allowed by the present invention allows a plurality of such mechanisms to be provided, spaced so as to form an array of elongate objects, each mechanism being adapted to drive its associated elongate object independently of the others. This overcomes, for example, the difficulties encountered in existing EDM and EDT apparatus.

Examples of suitable piezoactive materials and fabrication methods can be found in the following documents.

Uchino K. Applied aspects of piezoelectricity. *Key Engineering Materials*, Vol. 66–67, p. 311–37, (1992).

Safari A. Development of piezoelectric composites for transducers. *Journal de physique III*, Vol, 4, Iss. 7, p. 1129–49 (1994).

Ragulskis K., Bansevicius R., Barauskas R. and Kulvietis G. *Vibromotors for precision microrobots*. Hemisphere Pub. Co., New York, 310p. (1988).

Fleischer M. and Meixner H. *Ultrasonic motors. Mechatronics*, Vol. 1, Iss.4 p. 403–15 (1991).

Ueha S. and Tomikawa Y. *Ultrasonic motors. Theory and applications*. Oxford Science Publications, Clarendon Press, Oxford, 298p (1993).

BRIEF DESCRIPTION OF DRAWINGS

Embodiments of the present invention will now be described, by way of example, with reference to the accompanying figures, in which.

DETAILED DESCRIPTION OF EMBODIMENTS

There are three basic methods to transform high frequency resonant oscillations into continuous motion, which influence the construction and design of active bearings:

(i) The transformation of high frequency oblique impacts. The method is based on the superposition of tangential components of the impact pulse and involves the use of two-component oscillations, generated by a special configuration transducer. According to the hypothesis of the viscous friction [Ragulstis et al, supra] the tangential component of the impact pulse is independent of the magnitude of its normal component and is defined by the coefficient of instantaneous friction at impact. The latter depends on the properties and condition of the contact zone surfaces. According to the hypothesis of dry friction, the tangential component of dry friction is proportional to its normal component, and the coefficient of proportionality is equal to the coefficient of dry friction.

Figure 1:
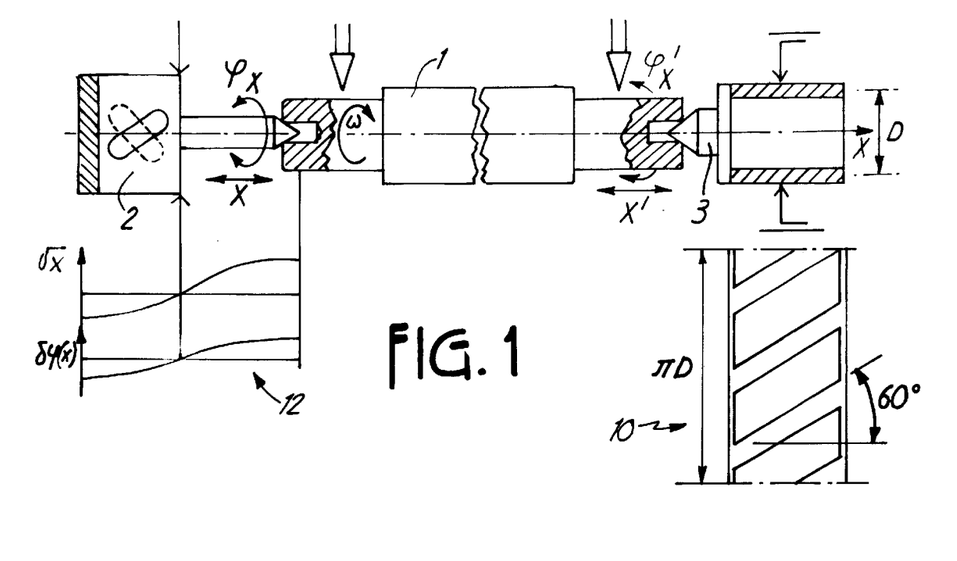
FIG. 1 is a side view, partially in section, of a first form of bearing according to the present invention.

An example of active support of this type is given in FIG. 1, where at both contact zones two component (longitudinal and torsional) resonant oscillations of the transducer excite periodic oblique impacts.

In this and in all following figures the symbols ↓↑ indicate the point of transducer or waveguide, where it is fixed to the housing; the symbols ↑↓ show the directions in which error measurements are performed.

For practical design purposes it is important that there is at least one common node for both types of oscillations, which can be used to fix the transducer to the housing.

Other active devices based on the use of oblique impacts are shown in FIGS. 2 and 3, FIGS. 6 and 7, FIG. 9, and FIGS. 11 and 12 (rotation around x and y axes).

Figure 5:
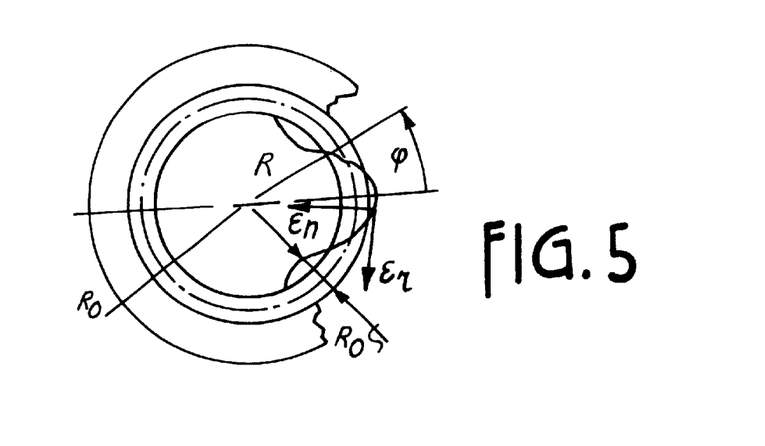
FIG. 5 illustrates the transformation of travelling wave oscillations into continuous motion.

(ii) The transformation of travelling wave oscillations into continuous motion through frictional interaction of the travelling wave motion of the transducer and driven component (rotor, shaft, etc). If one active component of the bearing is made in the form of a hollow cylinder, for travelling wave we have (FIG. 5):

$$R=R_o[1+\zeta \sin(n_1\Psi-\lambda t)]$$

where $\zeta$ is the relative oscillation amplitude; $n_1$ is the wave number and $\Psi$ is angular coordinate of the considered cross section. Then the tangential $\epsilon_t$ and the radial $\epsilon_r$ displacement of points on the neutral surface of the active element are described by:

$$\frac{d\varepsilon_p}{dt} = -\varepsilon_r \frac{d\omega}{dt}$$

Here $d\Psi/dt$ is the angular velocity of the wave, equal (at $n_1=2$) to the angular frequency of the harmonic signal. The angular speed of the rotor $\omega$ depends on the value of the interference fit between the components and an applied external moment, but it usually is less than $1/R \cdot d\epsilon_p/dt$ due to frictional interaction between both components.

The schematics of the active bearings and supports, based on the transformation of travelling wave type oscillation into continuous motion are shown in FIGS. 4, 8, 11 and 12 (rotation around z axis).

(iii) The transformation of non-harmonic oscillations into continuous motion using non-linear dependence of friction force upon velocity in contact zone. Saw-tooth oscillations are the most desirable since they produce the highest velocity. However, a saw-tooth motion is almost impossible to generate using resonant excited oscillations. A saw-tooth approximation can be achieved by using a sectioned electrode, where an excitation voltage at the fundamental frequency $U_1(t)=-2U_o \sin\lambda t$ is applied to one electrode and the second harmonic $U_2(t)=-U_o \sin 2\lambda t$ to the other electrode. The advantage of this type of active bearing is that only one type of oscillation, tangential in relation to the contact zone is being used.

This type of active bearing is characterised by its very high resolution which depends on the surface quality of the contact zone.

Figure 10:
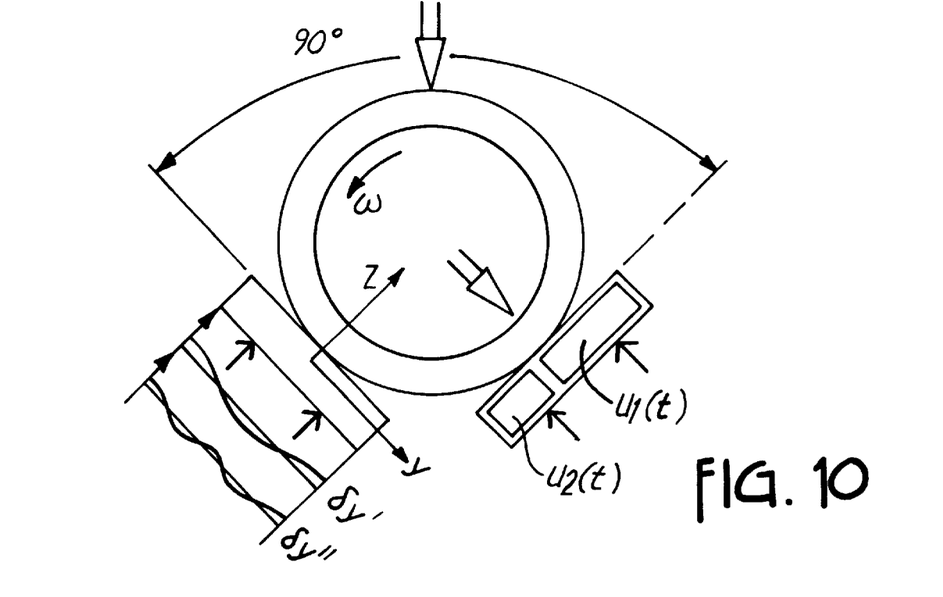
FIG. 10 shows an end view of an eighth form of bearing according to the present invention.

The schematic of active support, based on the use of non-harmonic oscillations is given in FIG. 10.

In the device shown in FIG. 1 rotation of the shaft 1 is effected by transforming oblique impacts in the contact zones between the shaft and transducers 2 and 3. Oblique impacts are generated by the superposition of two types of oscillations in each transducer—resonant longitudinal and torsional. Two different methods to generate simultaneously both types of oscillations are shown. FIG. 1 illustrates at 10 the arrangement of piezoelectric elements, and at 12 the desired displacements achieved in the longitudinal (x) and rotational ($\Psi$) axes. This first method is based on the axial asymmetry in wave guide design (two or more slots made at an angle with the x axis); the other uses the asymmetry of exciting zones (electrodes)—here both types of oscillation are generated simultaneously.

Figure 2:
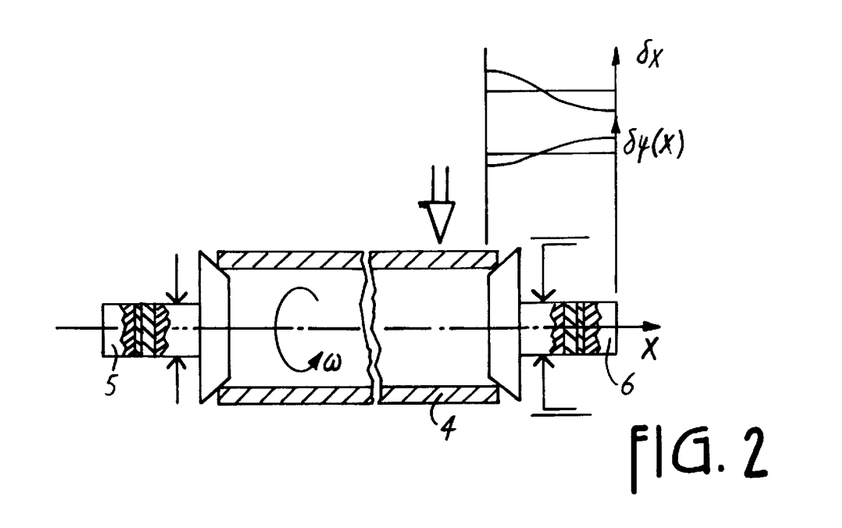
FIG. 2 is a side view, partially in section, of a second form of bearing according to the present invention.

A similar device is shown in FIG. 2, where piezoelectric transducers with a shearing effect are shown. At the shearing effect the applied electric field and the polarization of the ceramic are perpendicular to each other. The essential advantage of the use in this device of shearing effect is that the piezoelectric constant $d_{15}$ is much higher. As in the device shown in FIG. 1, the oblique impacts generated in the contact zones between the component 4 and transducers 5,6, are transformed into rotation of component 4.

Figure 3:
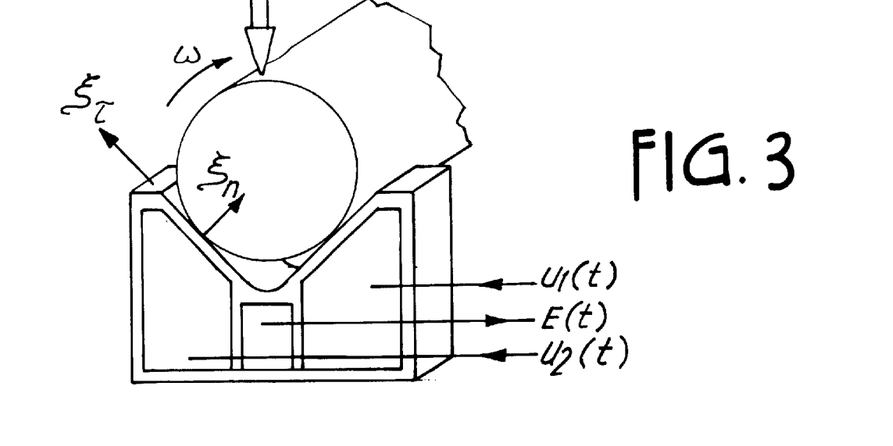
FIG. 3 is a perspective view of a third form of bearing according to the present invention.

A support for heavy shafts is shown in FIG. 3, where a V-block is made from piezoactive material with sectioned electrodes. Applying high frequency voltage $U_1(t)$ to the electrode of V-block two component oscillations (normal and tangential in relation to the contact zone) are generated, resulting in the rotation of shaft. Application of voltage $U_2(t)$ results in reversing the motion of the shaft. Signal E (t), taken from the middle electrode, contains information about the mass of the shaft and can be used to realize an adaptive active bearing, in which the position of the shaft does not vary when some external disturbance is applied.

Figure 4:
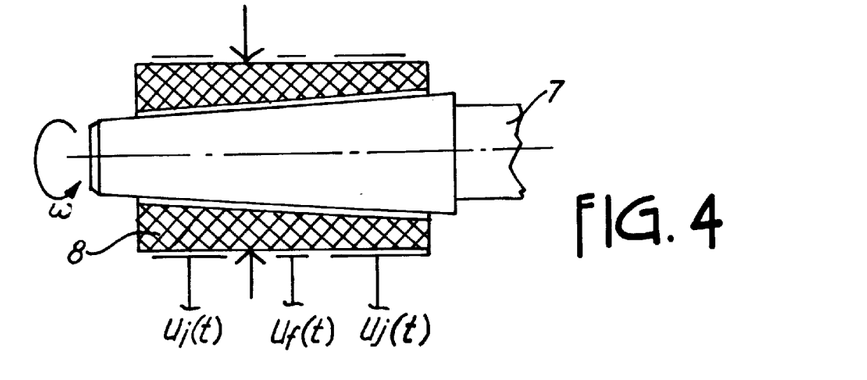
FIG. 4 is a perspective view of a fourth form of bearing according to the present invention.

A device with a tapered active centre is shown in FIG. 4. Here the rotation of the conical shaft 7 is generated by the transducer 8, oscillating in the travelling wave mode. To control the torque in the contact area between both components, oscillations of a much higher frequency than that of the travelling wave are generated by applying voltage $U_f(t)$, generating small amplitude but high frequency oscillations, reducing frictional forces in the contact area.

Figure 6:
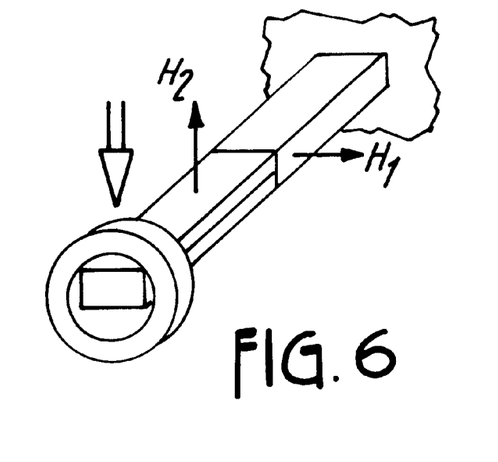
FIGS. 6 and 7 show, in perspective and cross-section respectively, a fifth form of bearing according to the present invention.
Figure 7:
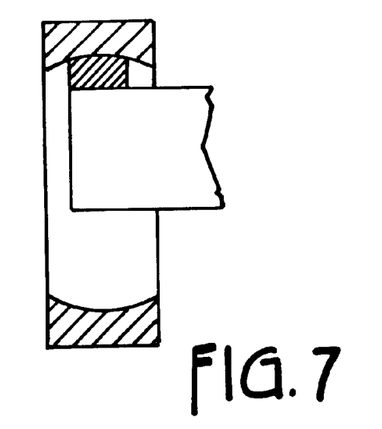
Figure 8:
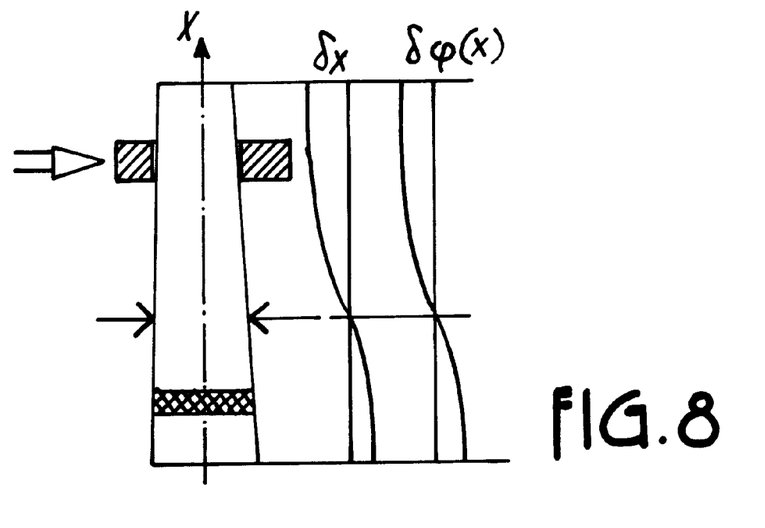
FIG. 8 shows, in side view and partial section, a sixth form of bearing according to the present invention.

The modifications of the active supports for ring or bush type components are shown in FIGS. 6–10. For small rings rods for piezoceramics with two different vectors of polarization $H_1$ and $H_2$ are used (FIG. 6). It allows the generation of two perpendicular oscillations, resulting in the oblique impacts in two contact zones with the ring.

The rotation of small rings can be effected by using tapered waveguides, in which two types of resonant oscillation are generated; longitudinal along x axis and torsional about the same axis.

Figure 9:
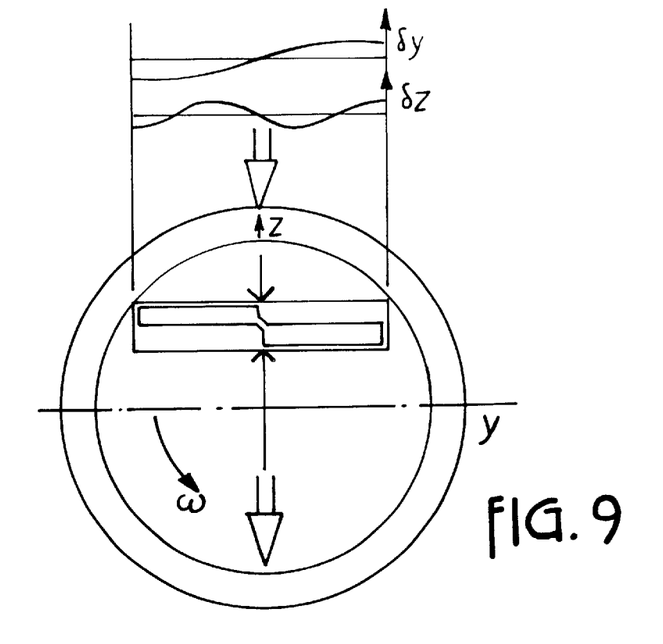
FIG. 9 shows an end view of a seventh form of bearing according to the present invention.

The rotation of bigger rings can be realized using the schematics shown in FIGS. 9 and 10. In FIG. 9 a ring is mounted on a piezoelectric transducer, in which two types of oscillations are being generated: resonant longitudinal and second mode flexural oscillations in the plane of the transducer. It results in oblique impacts in the contact zones; the direction of tangential component of impact in both contact zones is the same.

Still larger rings are rotated by using non-harmonic oscillations, generated by two piezoelectric transducers; here only tangential components of oscillations are used. The device is characterized by very high resolution and quick response.

Figure 11:
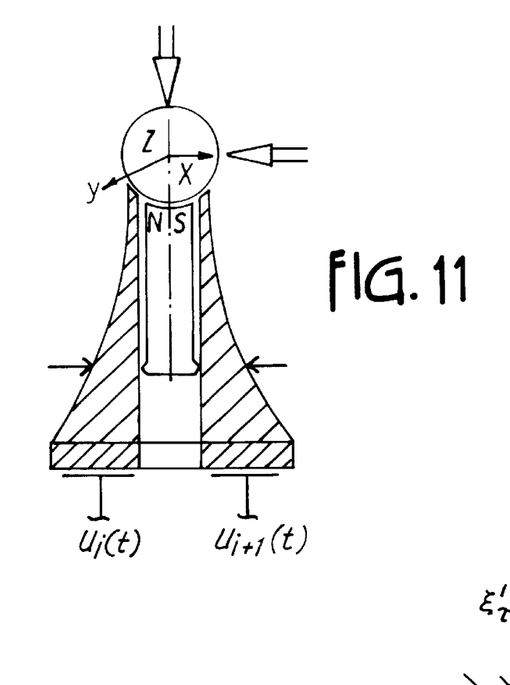
FIG. 11 shows a cross-section of a ninth form of bearing according to the present invention.
Figure 12:
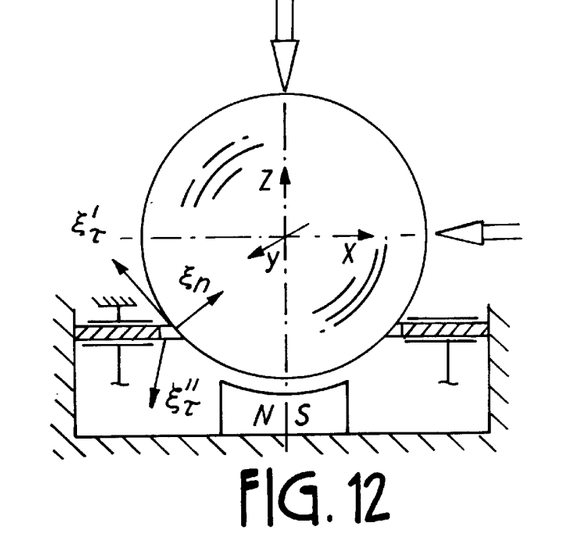
FIG. 12 shows a side view of a tenth form of bearing according to the present invention.
Figure 13:
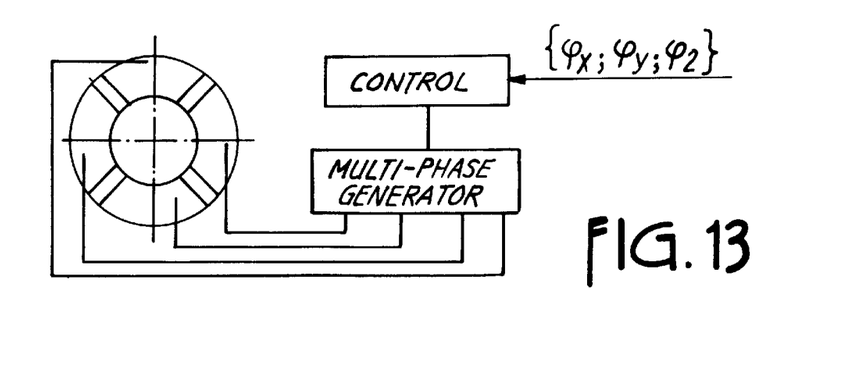
FIG. 13 shows a top view of the tenth form illustrated in FIG. 12.

In FIGS. 11–13 schematics of active supports for spherical components are shown. Small diameter spheres are supported and rotated about any axis (x, y or z) by a piezoelectric horn with sectioned electrodes in which it is possible to generate travelling wave type oscillations in the contact area (rotation around z axis for supported shown both in FIGS. 11 and 12). By activating only one electrode of the transducer, it is possible to generate oscillations in the contact area, distributed asymmetrically. As a result, rotation around axes x or y will be effected.

Figure 14A:
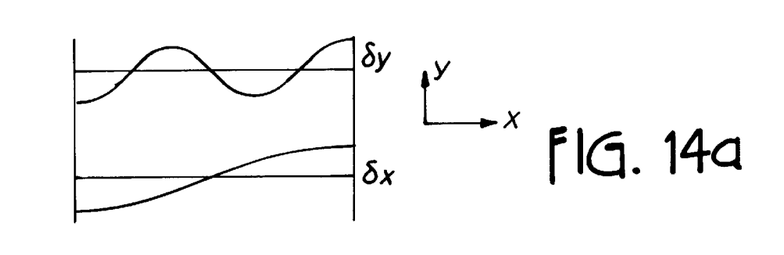
FIGS. 14a, 14b and 14c illustrate an eleventh form of the invention.
Figure 14B:
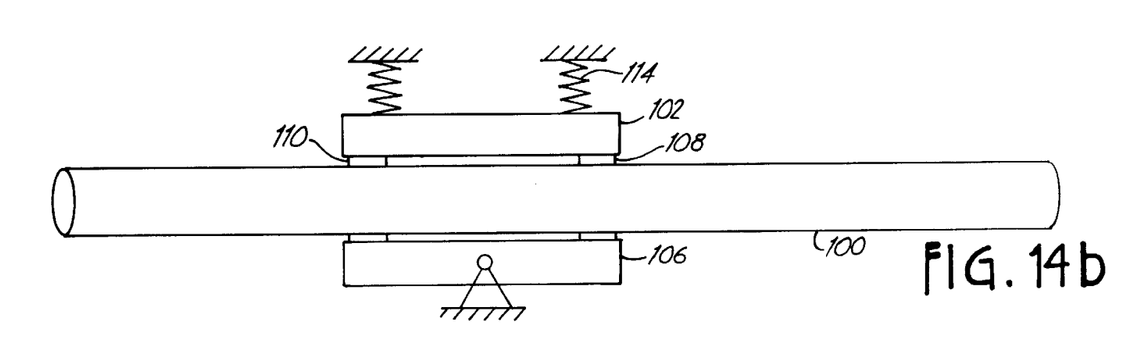
Figure 14C:
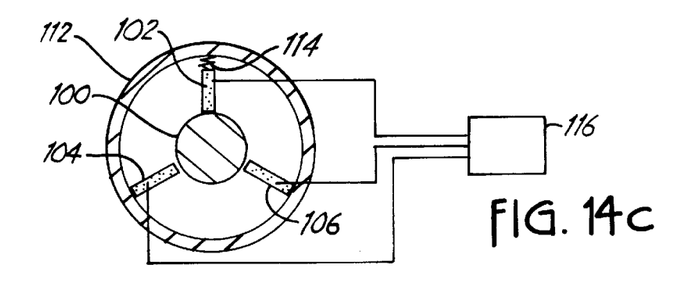

FIGS. 14a, 14b and 14c show a mechanism for supporting, guiding and moving an elongate object such as a rod 100. The rod 100 is supported by three piezoelectric actuators 102, 104 and 106. Each comprises a block of piezoactive material with two ceramic contact pieces 108, 110, and is supplied with a high frequency electrical signal by a control unit 116. A vibratory oscillation is established in each actuator as per FIG. 14a. The result of the illustrated vibration is that each contact piece 108, 110 moves in a generally circular path tangential to the surface of the rod 100, like handed but in antiphase. Thus, each contact piece repeatedly impacts the surface of the rod 100 with a tangential velocity. These repeated impacts drive the rod in the appropriate direction.

The lower actuators 104, 106 are fixed to a housing 112. The upper actuator 102 is biassed downwardly via springs 114 which serve to maintain contact with the rod 100.

Figure 15A:
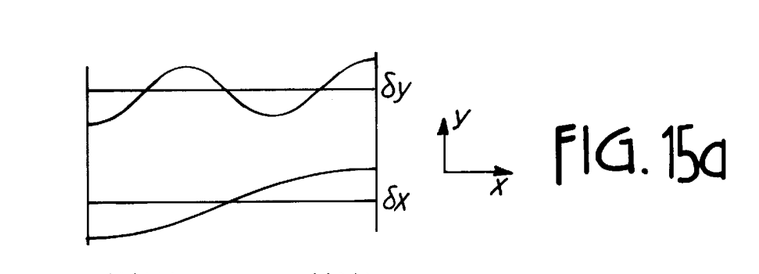
FIGS. 15a, 15b and 15c illustrate a twelfth form of the invention.
Figure 15B:
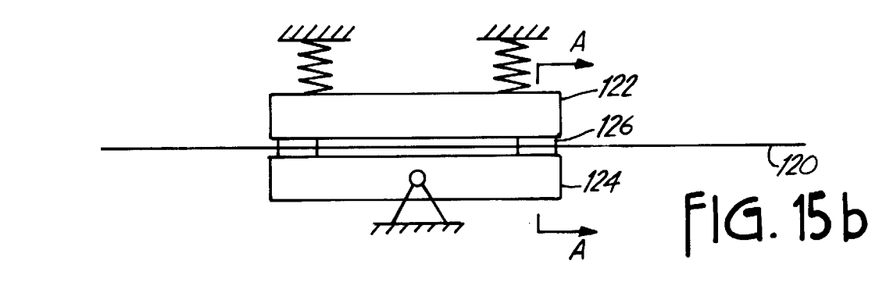
Figure 15C:
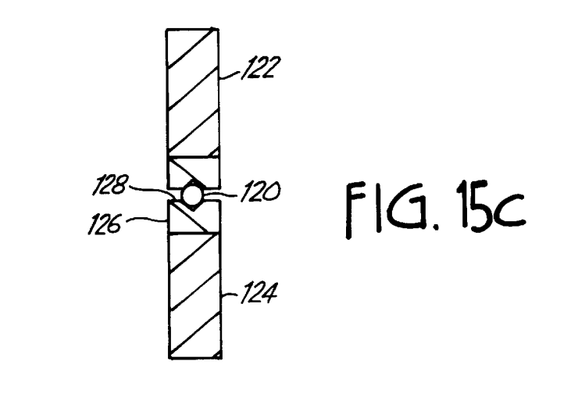

FIGS. 15a, 15b and 15c show a similar arrangement for use with a wire 120. Two piezo actuators 122, 124 are arranged either side of the wire 120 but are otherwise identical to those of FIG. 14. Each contact piece 126 is provided with a V-notch along its longitudinal extent, in which fits the wire 120. This ensures that the device is insensitive to orientation. The device operates similarly to that of FIG. 14.

Figure 16A:
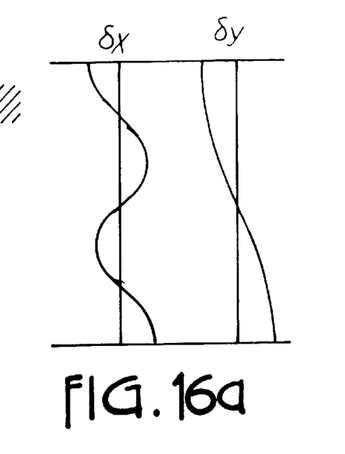
FIGS. 16a, 16b and 16c illustrate a thirteenth form of the invention.
Figure 16B:
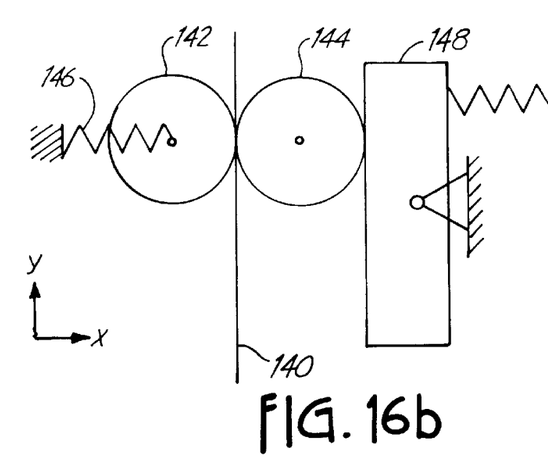
Figure 16C:
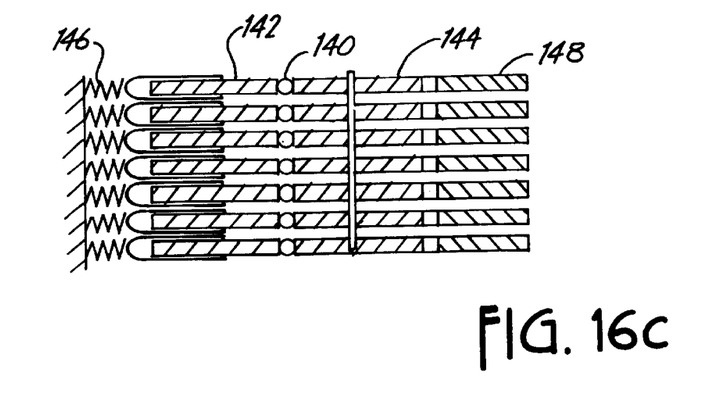

FIGS. 16a, 16b and 16c show a device capable of driving an array of wires. Each wire 140 is sandwiched between a pair of rotatable discs 142, 144. The first disc 142 is biassed toward the wire by a spring 146. The second disc 144 is driven at its opposed edge by a piezo actuator 148, which is constructed on the same principles as those of FIGS. 14 and 15. Thus, each wire can be driven back and forth.

An array of such devices is provided, with the wires 140 in register. Thus, an array of wires is provided, each of which can be driven independently.

This embodiment and those before it are obviously not limited to the rods or wires shown but can be applied with suitable modification to articles of other shapes.

Figure 17:
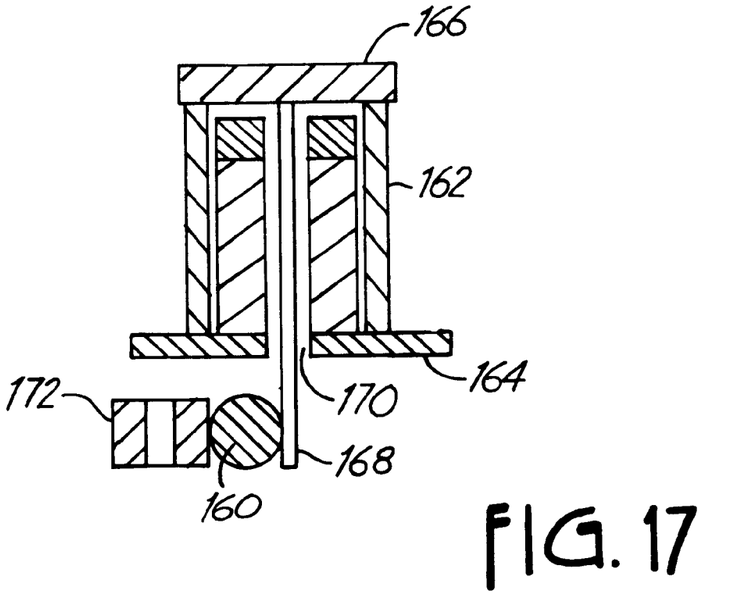
FIG. 17 illustrates a fourteenth form of the invention.

FIG. 17 shows an alternative compact drive device for a wire 160. A cylindrical piezo actuator 162, here shown in section, is mounted on a base unit 164. A rotatable disc 166 sits on the end of the actuator 162 and can be rotated thereby. A spindle 168 is connected to the centre of the disc 166 and depends vertically through the centre of the actuator 162 and through an aperture 170 in the base 164. The spindle 168 will naturally rotate with the disc 166.

Beneath the base 164 the wire 160 is sandwiched between the spindle 168 and a rotatable bearing unit 172, such that it contacts the curved faces of each.

When the piezo actuator is activated, the disc 166 and spindle 168 rotate, causing longitudinal motion of the wire 160 and rotation of the bearing 172. The wire can be suspended vertically in the arrangement, or it can be held horizontally or at any angle. If the wire is non-vertical, it is preferably supported by further such units along its length to prevent sagging without using error-inducing passive bearings.

It will be appreciated that the foregoing is merely exemplary of devices in accordance with the invention and that modifications can readily be made without departing from the true scope of the invention.

What is claimed is:

1. A drive mechanism for a plurality of generally parallel elongate prismatic objects, comprising, for each object;

a transducer including a piezoelectric element, the transducer being positioned so as to contact one of the elongate object, and a control means adapted to supply a signal to a piezoelectric element thereby to cause vibration thereof; vibration of the piezoelectric element thereby causing motion, relative to the drive mechanism, in a first degree of freedom being longitudinal with respect to the relevant elongate object, the transducer being adapted to constrain motion of the elongate object in a degree of freedom other than rotation about its longitudinal axis, the plurality of transducers being arranged in an array transverse to the longitudinal direction, each transducer being adapted to drive its associated elongate object independently of the remaining transducers;

wherein contact between the transducer and the elongate object exists at at least two locations spaced along the longitudinal extent of the elongate object, wherein the control means causes vibration of the piezoelectric element in at least an axis perpendicular to the longitudinal axis of the object, the perpendicular vibration being such that the two contact points move out of phase;

wherein the movement of the two contact locations is 180° out of phase; and wherein the perpendicular vibration includes three nodes along the length of the piezoelectric element.

2. A drive mechanism according to claim 1 wherein the elongate object is wholly supported by the transducer.

3. A drive mechanism according to claim 1 wherein a wear pad is disposed between the piezoelectric element and the elongate object thereby to prevent direct contact.

4. A drive mechanism according to claim 1 wherein a prismatic cross-section of the elongate object is cylindrical.

5. A drive mechanism according to claim 1 in which the control means causes vibration of the piezoelectric element in at least an axis parallel to the longitudinal axis of the object, the parallel vibration being such that the two contact locations move out of phase.

6. A machine according to claim 5 wherein the movement of the two contact points is 180° out of phase.

7. A drive mechanism according to claim 5 wherein the parallel vibration includes a single node along the length of the piezoelectric element.

8. A drive mechanism according to claim 7 wherein the single node lies between the two contact locations.

9. A machine according to claim 1 wherein the control means causes vibration of the piezoelectric element in an axis parallel to the longitudinal axis of the object and also perpendicular to the axis; and wherein the node of the parallel vibrations and a node of the perpendicular vibrations coincide.

10. A machine according to claim 9 wherein the node of the parallel vibration coincides with the middle node of the perpendicular vibrations.

11. A machine according to claim 9 wherein the point of coincidence is substantially at the centre of the piezoelectric element.

12. A drive mechanism according to claim 1 wherein the control means is adapted to supply a DC signal superimposed upon any vibration-inducing signals thereby to adjust a position of the elongate object in at least one direction substantially perpendicular to the length of the elongate object.

13. A drive mechanism for a plurality of generally parallel elongate prismatic objects, comprising, for each object;

a transducer including a piezoelectric element, the transducer being positioned so as to contact one of the elongate object, and a control means adapted to supply a signal to a piezoelectric element thereby to cause vibration thereof; vibration of the piezoelectric element thereby causing motion, relative to the drive mechanism, in a first degree of freedom being longitudinal with respect to the relevant elongate object, the transducer being adapted to constrain motion of the elongate object in a degree of freedom other than rotation about its longitudinal axis, the plurality of transducers being arranged in an array transverse to the longitudinal direction, each transducer being adapted to drive its associated elongate object independently of the remaining transducers;

wherein the transducer constrains motion of the elongate object in all degrees of freedom other than translation along its longitudinal axis and rotation about that axis.

14. A machine according to claim 13 in which the control means causes vibration of the piezoelectric element in at least an axis perpendicular to the longitudinal axis of the object, the perpendicular vibration being such that the two contact points move out of phase.

15. A machine according to claim 14 wherein the movement of the two contact points is 180° out of phase.

16. A drive mechanism for a plurality of generally parallel elongate prismatic objects, comprising, for each object;

a transducer including a piezoelectric element, the transducer being positioned so as to contact one of the elongate object, and a control means adapted to supply a signal to a piezoelectric element thereby to cause vibration thereof; vibration of the piezoelectric element thereby causing motion, relative to the drive mechanism, in a first degree of freedom being longitudinal with respect to he relevant elongate object, the transducer being adapted to constrain motion of the elongate object in a degree of freedom other than rotation about its longitudinal axis, the plurality of transducers being arranged in an array transverse to the longitudinal direction, each transducer being adapted to drive its associated elongate object independently of the remaining transducers;

wherein the transducer include a motion transfer means acted upon by the piezoelectric element and which in turn acts on the elongate object.

17. A machine according to claim 16 wherein the motion transfer means comprises a rotatable disc.

18. A machine according to claim 17 wherein the rotatable disc comprises a co-axial spindle extending therefrom, a surface of the spindle contacting the elongate object.

19. A machine according to claim 18 wherein the piezoelectric element is cylindrical and substantially co-axial with the spindle, contact between the piezoelectric element and the disc being along a circular path on a planar surface of the disc.

20. A machine according to claim 17 wherein contact between the piezoelectric element and the disc is at one or more points on the circumferential face of the disc.

21. A machine according to claim 16 including a magnetic element which acts on the motion transfer means thereby to maintain it in contact with the piezoelectric element.

22. A drive mechanism according to claim 16 wherein the prismatic object is an electrode for electro-discharge machining or electro-discharge texturing.

* * * * *